Nov. 18, 1958     W. R. KOHRS ET AL     2,860,763
TRANSFER MECHANISM
Filed July 31, 1956     3 Sheets-Sheet 3
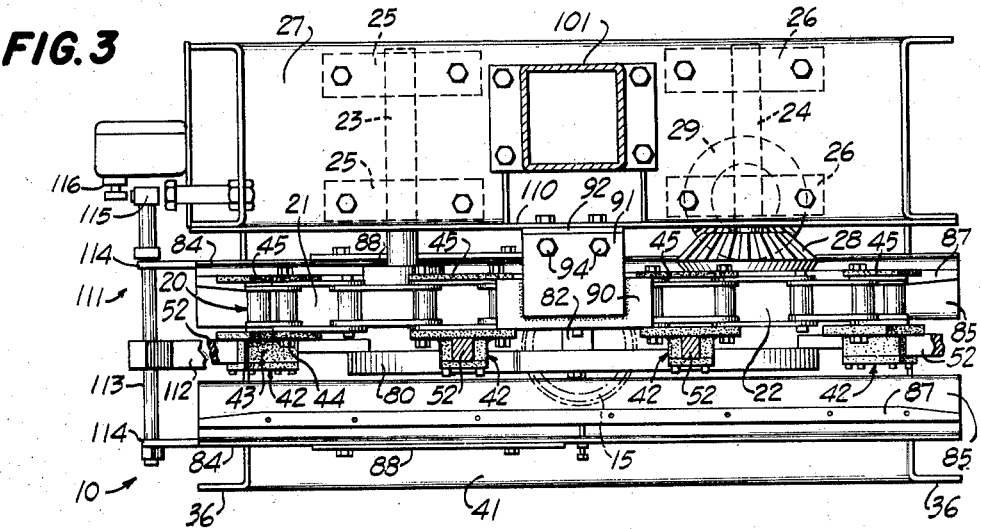
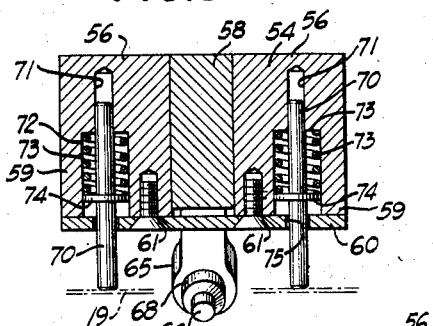
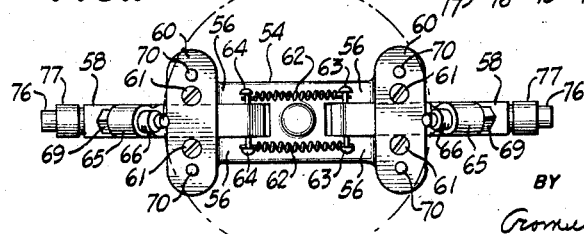
INVENTORS
WILLIAM R. KOHRS,
DANIEL L. ORLOFF and
ROBERT L. ROHDE
BY
*Cromwell, Greist and Warden*
ATTORNEYS United States Patent Office 2,860,763
Patented Nov. 18, 1958

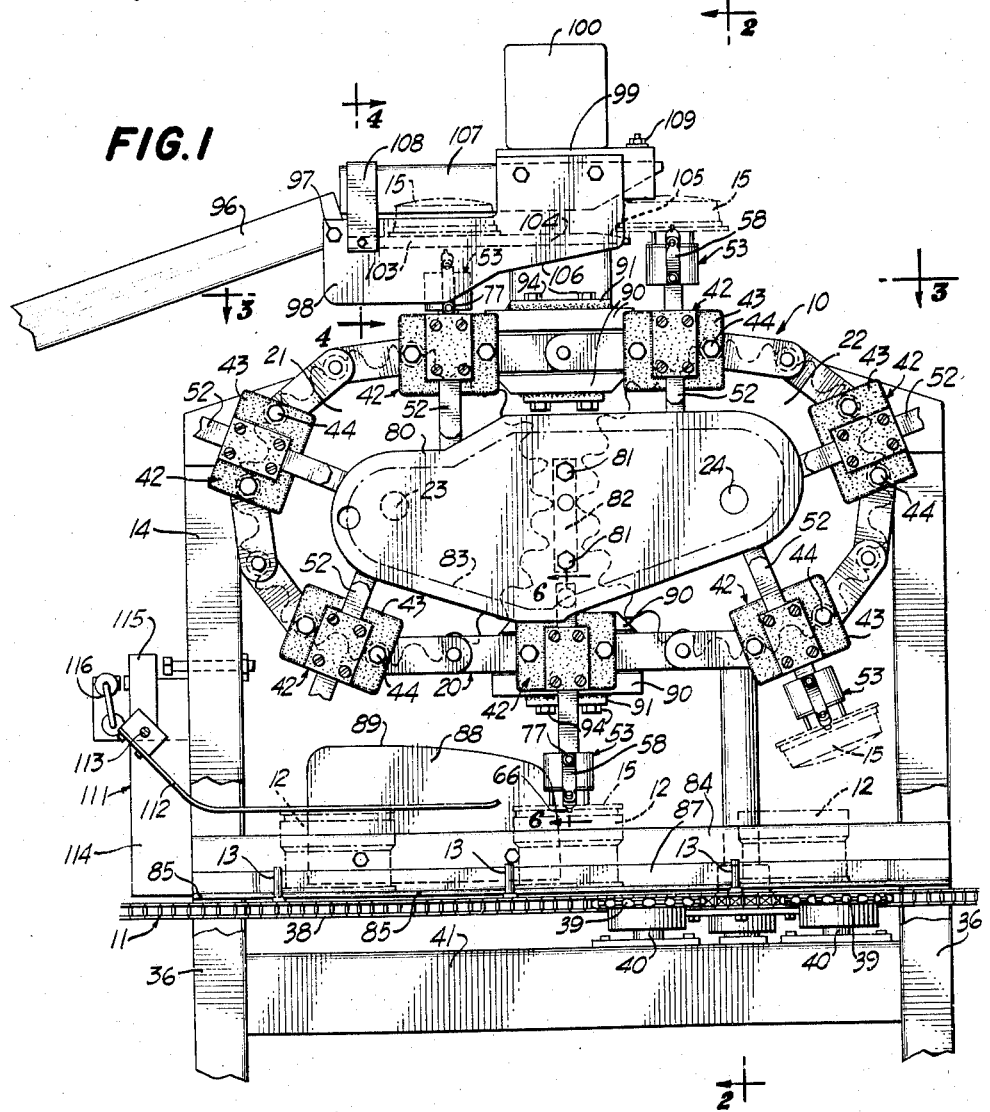

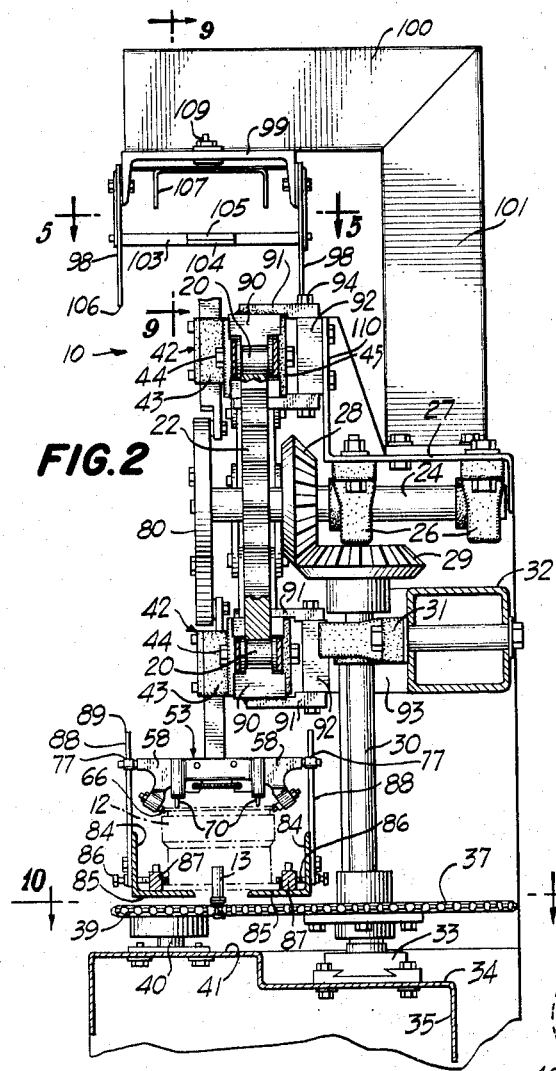

2,860,763

TRANSFER MECHANISM

William R. Kohrs and Daniel L. Orloff, Madison, and Robert L. Rohde, Fort Atkinson, Wis., assignors to Oscar Mayer & Co., Inc., Chicago, Ill., a corporation of Illinois Application July 31, 1956, Serial No. 601,210

8 Claims. (Cl. 198—33)

This invention relates to article transfer mechanism and is more particularly concerned with improvements in a mechanism for transferring successive articles from pocket forming holders which are carried on a continuously traveling conveyor to an overhead delivery chute.

It is a general object of the invention to provide an article transfer mechanism which is adapted to be mounted between a generally horizontal run of a continuously traveling conveyor having article supporting elements carried thereon and a downwardly inclined article delivery chute arranged above the conveyor wherein mechanism is provided for gripping the successive articles, removing the same from the supporting elements, and thereafter carrying the articles upwardly to a discharge station above the conveyor where the articles are released for delivery to the upper end of the inclined chute.

It is a more specific object of the invention to provide a mechanism for removing packaged objects from a series of article supporting forms carried on a traveling conveyor which comprises a plurality of gripper heads mounted for movement in timed relation with the conveyor and in an endless path adjacent the conveyor and beneath the upper end of a downwardly inclined delivery chute whereby successive packages may be gripped and held on the heads while the latter advance to the top of the path of movement thereof where the packages are released from the heads in position for discharge from the mechanism by the delivery chute with the packages being inverted during their movement from the forms to the chute.

It is a further object of the invention to provide an article transfer mechanism for association with a packaging operation in which the packages are delivered from a packaging machine by a horizontal conveyor on which they are supported in a series of longitudinally spaced forms, which transfer mechanism comprises an endless transfer conveyor mounted for movement in a vertical plane above the horizontal conveyor, a series of gripper carrying heads movably mounted on the transfer conveyor, gripper members on the heads which are operative to engage and grip the successive packages as the forms pass beneath the same, cam means for operating the grippers and cam means for moving the heads relative to the path of movement of the package carrying forms whereby the heads are aligned with the forms for travel in parallel paths for a predetermined distance and thereafter the heads are moved in a vertical direction away from the forms to strip the packages from the latter and to convey the packages to a point where they are released for delivery to a discharge chute which is arranged above the same.

It is a still further object of the invention to provide a mechanism of the character described which is operative to invert the packages after they are stripped from the forms in which they are carried.

These and other objects and advantages of the invention will be apparent from a consideration of the mechanism which is shown by way of illustration in the accompanying drawings wherein:

Figure 1 is an elevation of one side of a transfer mechanism which embodies the principal features of the invention, the mechanism being associated with an article or package carrying conveyor, with which it is adapted to be used;

Figure 2 is a vertical cross section taken on the line 2—2 of Figure 1;

Figure 3 is a horizontal cross section taken on the line 3—3 of Figure 1;

Figure 4 is a vertical cross section, on an enlarged scale, taken on the line 4—4 of Figure 1;

Figure 5 is a horizontal cross section, on an enlarged scale, taken on the line 5—5 of Figure 2;

Figure 6 is a vertical cross section, on a larger scale, taken on the line 6—6 of Figure 1;

Figure 7 is a bottom view of a gripper head taken generally on the line 7—7 of Figure 6;

Figure 8 is a cross section, on an enlarged scale, taken on the line 8—8 of Figure 6;

Figure 9 is a fragmentary vertical cross section, on an enlarged scale, taken on the line 9—9 of Figure 2; and Figure 10 is a fragmentary horizontal cross section taken on the line 10—10 of Figure 2.

Referring particularly to Figures 1 and 2 of the drawings, there is illustrated a transfer mechanism or apparatus 10 which is mounted for cooperation with a horizontal run of an endless chain conveyor 11. The conveyor 11 carries a series of article supporting forms 12 which are engaged at the trailing edge thereof by upstanding pusher fingers 13, the latter being spaced along the top surface of the conveyor. The conveyor 11 is driven by power mechanism (not shown) which continuously advances the same in a straight line path beneath the transfer mechanism 10, the latter being mounted on a supporting framework 14 above the conveyor 11.

In the particular mechanism illustrated the conveyor 11 forms part of a packaging operation in which a product is enclosed in a flexible transparent wrapper which has its marginal edges crimp sealed to the marginal edges of a metal disc having the general form of a can lid, with a relatively flexible narrow sealing ring member having edge portions interposed between the wrapper and the closure disc and forming part of the crimped seal. In the packaging operation, the product, which may be a predetermined quantity of a sliced meat, is assembled with the packaging elements in the tubular carrying members 12, each of the latter being in the form of a tubular section which is adapted to support the packaging elements while they are assembled in package forming relation and while the package is closed and sealed in a package forming machine. The package, when completed, is in the form indicated at 15 in Figures 4 and 6 and is supported in inverted partially projecting position in the top of the form 12. A detailed description of one form of the package 15 may be had by reference to copending application Serial No. 548,093, filed November 21, 1955. Briefly, the package 15 comprises an outer transparent wrapper which envelops the product and which has its marginal edges crimp sealed to a bottom supporting disc-like member 16 of relatively rigid material, preferably metal plate. The bottom forming plate member 16 has its marginal edges crimp sealed to the marginal edges of the wrapper and also to a sealing band or ring member 17 to form thereon a flange 18 which projects radially somewhat from the sealing ring 17. In the inverted position as shown in Figure 6, the package 15 presents an upwardly facing bottom surface 19 which is indented and surrounded by the upstanding peripheral flange formation 18, the latter providing a downwardly facing peripheral ledge beneath which the package may be gripped, as will be subsequently explained.

The package or article carrying forms 12 are shaped and proportioned so that they support the package 15 by engagement of the top edge thereof with the edge of the sealing ring 17 so that the bottom forming member 16 and the crimped edge or flange formation 18 projects above the upper edge of the form 12 an appreciable distance.

The transfer mechanism 10 comprises an endless chain 20 which is carried on a pair of horizontally spaced end supporting sprockets 21 and 22. The sprockets 21 and 22 are rotatably supported in a vertical plane by means of transverse shafts 23 and 24, respectively, the shafts 23 and 24 being journalled in pairs of bearing brackets 25 and 26, respectively. The bearing brackets 25 and 26 are secured to the lower face of a top longitudinal frame member 27 which is of generally Z-shaped cross section and on which the bearing brackets of the respective pairs 25 and 26 are laterally spaced and in depending relation. The shaft 23 is an idler shaft while the shaft 24 carries a beveled gear 28 which is in driving relation with a corresponding bevel gear 29 secured on the top of a vertical drive shaft 30. The drive shaft 30 is journalled in a bearing bracket 31 adjacent its upper end which is secured in laterally extending relation on a longitudinally extending cross beam 32 forming part of the frame structure. At its lower end the shaft 30 is supported in a bearing in a bracket 33 which is mounted on the upper face of a shelf forming portion 34 of a longitudinal table forming channel member 35 which is connected to the upright end channels 36 and forms part of the supporting frame 14. The drive shaft 30 carries at its lower end a drive sprocket 37 which is in driving engagement with the chain 38 forming the conveyor 11. Two idler sprockets 39 are arranged in spaced relation longitudinally of the travel of the chain 38 and opposite the sprocket 37 to hold the chain 38 in driving relation with the sprocket 37. The idler sprockets 39 are mounted on stub shafts 40 which are secured to the top forming portion 41 of the longitudinal frame member 35. With this drive arrangement the chain 20 of the transfer conveyor is driven in timed relation to the movement of the chain 38 of the article carrying conveyor 11 and operates in a vertical plane extending above the conveyor 11.

A series of gripper head mounting brackets 42 are arranged in longitudinally spaced relation on the conveyor chain 20. Each mounting bracket 42 (Figures 1, 2 and 6) comprises a generally rectangular block or plate member 43 which is bolted to the outside face of a link of the chain 20 by link connecting and pivot forming bolts 44 which also clamp to the opposite face of the chain link a back plate member 45. The opposed upper and lower marginal faces of the bracket plate 43 and the back plate member 45, respectively, are grooved or recessed slightly at 46 and 47 for a purpose which will be described. A generally rectangular embossment 48 is provided on the outermost face of the bracket plate 43 and grooved or recessed at 49 in a direction extending transversely of the longitudinal axis of the chain 20. The recess 49 opens outwardly and cooperates with a cover plate 50, secured thereon by fastening members 51, to form a guideway of generally rectangular cross section, which guideway receives in sliding relation the stem portion 52 of a T-shaped gripper head 53, the stem 52 being of generally rectangular cross section.

Each gripper head 53 includes a cross member 54 of generally H-shaped form which is rigidly attached to the outer end of the stem 52, the latter being pinned or otherwise rigidly connected to the center cross bar portion 55 of the member 54. The laterally spaced ends of the leg or side portions of the H-shaped head member 54 provide bearing members between which cross pins 57 are journalled and on which identical gripper arms 58 are mounted for swinging movement. At the outer ends of the leg members 56 projections 59 extend downwardly and are connected with opposite ends of a relatively thin, flat stop plate 60 (Figure 7) which is secured thereon by screws 61 to limit the movement of the arms 58 in the direction downwardly and inwardly of the head 53. The two oppositely disposed gripper arms 58 are urged about their pivots 57 by connecting tension springs 62 which are secured to the arms 58 at opposite ends at 63 and 64.

Each of the gripper arms 58 carries a downwardly and outwardly inclined extension 65 in which there is adjustably mounted a gripper pin 66. The extension 65 has a diagonal threaded bore 67 and the pin 66 has a threaded section 68 which is engaged in the threaded bore 67 and which is held in adjusted relation therein by the nut 69. The extensions 59 on the arms 56 of the head member 54 are bored to receive a pair of pins 70, the bore 71 being enlarged at 72 to receive a compression spring 73 which bears against a stop washer 74 on the pin 70, the stop washer 74 having its movement limited by the stop plate 60 which is apertured at 75 to accommodate the pin 70. The laterally spaced pairs of spring pressed pins 70 are adapted to bear on the indented bottom 19 of the closure plate 16 of the package 15 and to cooperate with the gripper pins 66 which are moved by movement of the arms 58 into gripping relation beneath the flange 18 of the package 15. Each of the gripper arms 58 is provided with an outwardly extending pin 76 at its outer end on which a cam roller 77 is mounted to permit control of the movement of the arms 58 in a manner which will be described.

The stem portion 52 of the head member 53 is provided at its inner end with a cam roller 78 which is mounted on a suitable supporting pin 79 and a cam plate 80 is fixed by the bolts 81 to a supporting bracket 82 which extends downwardly and forwardly of the cross bar 27. The cam 80 is provided with a track 83 for receiving the cam roller 78 and controlling the reciprocable movement of the head 53.

A guideway for supporting the article carrying forms 12 as they move beneath the transfer mechanism is provided immediately above the plate member 41 and comprises oppositely disposed angle members 84 which have their bottom flanges 85 in the same horizontal plane and extending towards each other with the inner margins in spaced relation to accommodate the movement of the pusher pins 13 and to receive on their upper surfaces the forms 12. Side guide pins or screws 86 are mounted for lateral adjustment in blocks 87 which are secured in upstanding relation on the upper faces of the flange members 85 and provided with threaded bores for receiving the screws 86, at the pick-up point beneath the transfer mechanism 10 to keep the forms 12 in lateral alignment while the pick-up head engages with the package 15. The gripper arms 58 are operated to move the gripper pins 66 outwardly to open position by means of upstanding cam plates 88 which are secured to the upstanding flanges of the guide members 84 and which provide tracks 89 on the top edges thereof for engagement with the cam rollers 77 on the arms 58.

The gripper heads 53 are held in alignment at the article pick-up point or station by a pair of upper and lower guide blocks 90 (Figures 1 and 6) which are fixedly mounted in oppositely disposed relation on the bracket plates 91 extending forwardly of the supporting bracket member 92, the latter being attached to the frame member 32 by a suitable forwardly extending bracket member 93. The forwardly extending bracket plates 91 are secured to the upper and lower faces of the bracket member 92 by suitable bolts 94 to permit disassembly and release of the conveyor chain 20. The side faces of the blocks 90 fit within the recess 46 and 47 in the bracket members 43 and 45 while the vertically opposed faces are provided with rib-like projecting portions or portions of reduced width at 95 which fit between the inner faces of the chain links so that the head support 42 is braced and held in proper alignment while each successive article is stripped from the forms 12.

An article receiving or discharge chute 96 (Figures 1, 2, 4 and 9) is supported at its upper end by bolts 97 between a pair of spaced side plates 98 which are supported on a top channel section 99 secured to the overhanging arm 100 of an L-shaped supporting post 101 which has its lower end secured by the bolts 102 to the cross frame member 27. The side plates 98 also support a horizontal plate 103 which forms a discharge platform between the side plates 98 and which has its forward end reduced in width at 104 and beveled at 105 to receive the packages 15 as they are delivered thereto from the gripper heads 53. The platform member 103 is aligned with the upper end of the chute 96 so that the packages 15 are moved across the platform 103 and into the chute 96. The lower margins of the side plates are cut at 106 to provide cam surfaces for engaging the cam rollers 77 on the gripper head arms 58 to release the packages 15 from the gripper head 53 by withdrawing or retracting the gripper pins 66, as the heads are advanced past the discharge point or station. A downwardly opening channel shaped guard member 107 is supported on the side plates 98 by a downwardly opening U-shaped cross support bracket 108 to limit the upward or sidewise movement of the packages 15 as they are released from the gripper heads 53.

The channel shaped guard member 107 is connected at its forward end to the support channel 99 by an adjusting hanger bolt 109 which permits vertical adjustment of the member 107 as desired.

The supporting plate 42 for each successive gripper head 53 and the chain link on which the same is carried are supported and braced at the article discharge point or station by upper and lower guide blocks which may be identical with the guide blocks 90 at the pick-up station and which may be arranged in the same manner with the supporting bracket member 92 being attached to the forward face of the upstanding flange 110 of the frame member 27.

At the entrance end to the transfer mechanism 10 a safety stop mechanism 111 is arranged which comprises a bent plate 112 pivoted at 113 on parallel forwardly extending bracket members 114. The bracket plate members 114 are secured to the upright frame member 36. An arm 115 extends upwardly of the pivot 113 and swings with the plate 112 to actuate a stop switch 116 controlling the current to the main drive motor. In the event that a form 12 is out of position on the conveyor 11 it will strike the plate 112 and swing it sufficiently to actuate the stop switch 116 and stop the machine for removal of the misplaced form.

In operation, the packages 15 are seated in the forms 12 as they are moved by the conveyor 11 and the pins 13 up to the transfer mechanism 10. The movement of the successive pick-up heads 53 which are carried on the transfer chain 20 is timed to align each of the heads 53 with a form 12 as the latter advance to the pick-up point. The cam plates 88 swing the arms 58 on the pick-up heads 53 as they approach the pick-up point to open the gripper pins 66. The head is moved in the direction transversely of the movement of the chain by the cam 80. As each successive gripper head 53 is lowered toward the bottom or closure plate 16 of a package 15 the spring pressed pins 70 engage at laterally spaced points with the uppermost surface of the plate 16 while the gripper pins 66 on the arms 58 are snapped into engagement beneath the flanges 18 by operation of the spring 62 as the cam rollers 77 move off the cam tracks 89. Continued advancing movement of the gripper heads 53 and withdrawal of the successive heads 53 in the upward direction by operation of the cam 80 strips each successive package 15 from its supporting form 12 and moves it up around sprocket 22 to the upper run of the conveyor chain 20 where the package 15 is carried forwardly above the tongue 104 of the platform member 103. The gripper arms 58 are operated by the cam tracks 106 to withdraw gripper pins 66 from beneath the flange 18 and release the package 15, the spring pressed pins 70 snapping the package 15 upwardly somewhat and depositing it on the top surface of the plate 103. Packages 15 resting on plate 103 are moved into the chute 96 by subsequent packages.

While specific details of construction and particular materials are referred to in describing the illustrated form of the machine, it will be understood that other details of construction and other materials may be resorted to within the spirit of the invention. Also, while the transfer mechanism is shown in association with a conveyor and articles thereon which form a part of a particular packaging operation, it will be understood that the mechanism may be employed for handling articles other than the packages which are shown and described herein.

We claim:

1. In an article handling machine, a transfer device for removing articles from successive supporting forms carried on a horizontal run of a continuously traveling endless conveyor and for delivering the articles in inverted relation onto a discharge platform arranged in spaced relation above the article carrying conveyor, said transfer device comprising an endless chain supported on a pair of spaced end sprockets which are mounted above the conveyor, a series of supporting plates mounted on the chain and having guideway forming recesses, T-shaped supporting heads with the stem portion thereof slidable in the guideway forming recess for movement in a path transversely of the path of travel of the chain, cam means for controlling the sliding movement of the heads, gripper members swingably mounted on opposite sides of each of the heads and having laterally extending arms, cam plates mounted along said chain and engaging said arms for controlling the operation of the gripper members to engage the articles between the gripper members as the heads are moved by the chain into aligned relation with the article supporting forms on the endless conveyor and cam plates mounted along said discharge platform for engaging said arms and moving the gripper members to release the articles as the heads are moved beneath the discharge platform.

2. In an article handling machine as recited in claim 1 and spring pressed pins on said head for engaging said article and cooperating with said gripper members to clamp the articles to said heads.

3. In an article handling machine, a transfer device for removing articles from successive supporting members carried on a horizontal run of a continuously traveling endless conveyor and for delivering the articles in inverted relation onto a discharge platform which is arranged above the transfer device, said transfer device comprising an endless conveyor supported on a pair of spaced end support members which are mounted on horizontal axes above the conveyor, a series of supporting bracket plates mounted on the endless transfer conveyor and having guideway forming recesses, gripper heads having a stem member slidably mounted in the guideway recesses, and a cross piece on the outer end of the stem member and extending transversely of the path of travel of the transfer conveyor, a cam means at the inner end of the stem member for controlling the sliding movement of the heads, gripper arms swingably mounted on opposite sides of each of the cross pieces having laterally extending portions, cam plates engaging said arm portions for moving the gripper members apart to engage the articles as the heads are moved by the transfer conveyor into aligned relation with the article supporting members on the article conveyor, and tension springs connecting said arm portions and urging the gripper members toward each other to frictionally clamp the articles as the heads are moved away from said cam plates.

4. In an article handling machine as recited in claim 3 and spring pressed pins on said heads for engaging said articles and cooperating with said gripper members to clamp the articles to said heads.

5. A transfer apparatus for removing articles from successive forms which are carried along a horizontal path and for discharging the articles in an inverted condition at a point spaced above the path of the article carrying forms, said apparatus comprising an upright supporting frame, an endless traveling chain mounted on horizontally spaced supports above the path of the article forms for travel in a generally vertical plane, a series of supporting blocks on said chain each having a guideway extending in the plane of operation of the chain and normal to the path of movement thereof a series of supporting heads each arranged on a stem forming member which is slidably mounted in a guideway in a supporting block, means for moving each stem forming member in a direction outwardly of the chain to position the supporting head adjacent an article carrying form moved into alignment therewith, and means for moving each stem forming member in a direction toward the chain when the supporting head advances to the point of article discharge, said supporting heads each having article gripping arms pivoted thereon in oppositely disposed relation which are operative to grip an article and hold it on the head, operating cam elements on said arms and cooperating cam elements on said supporting frame for opening and closing said gripper arms to engage an article supported in a form and thereafter to release the article when it is positioned by the traveling chain at the point of article discharge.

6. A transfer apparatus for removing articles from successive pocket forming members which are carried along a horizontal path and for discharging the articles in an inverted condition at a point spaced above the path of the article carrying forms, said apparatus comprising an upright supporting frame, an endless traveling chain conveyor mounted in a generally vertical plane on horizontally spaced supports above the path of the pocket forming members and having upper and lower runs, a series of members on said chain conveyor each having a guideway extending in the plane of operation of the chain and generally normal to the path of movement thereof, a series of article gripping heads each supported on a stem forming member which is slidably mounted in one of said guideway forming members, cam means for sliding each stem forming member in its guideway to move the gripping head away from the chain and toward a pocket forming member when the gripping head is aligned with the pocket forming member along the lower run of the conveyor and for sliding the stem member toward the chain when the gripping head is at the point of article discharge along the upper run of the chain conveyor, said gripping heads each having arms pivoted thereon in oppositely disposed relation, said arms having means for gripping an article and holding it on the head, and cooperating cam elements on said arms and on said supporting frame for operating said gripper arms to grip an article in a pocket forming member and to release the article when it is positioned by the traveling conveyor at the point of article discharge.

7. A transfer apparatus for removing articles having portions projecting from successive pocket forming members which are carried along a horizontal path and for discharging the articles in an inverted position at a point spaced above the path of the pocket forming members, said apparatus comprising an upright supporting frame, and endless traveling chain mounted for movement in a vertical plane on horizontally spaced supports above the path of the pocket forming members, a series of supporting members on said chain, a series of gripper heads each mounted on a slide bar, said supporting members each having a guideway for receiving the head carrying slide bars, means for reciprocating the slide bars to move each successive gripper head away from the chain when it is carried into registry with a pocket forming member and in a direction toward the chain when it is carried to the point of article discharge, said gripper heads each having a base member mounted on the slide bar, a pair of article gripping arms pivoted thereon in oppositely disposed relation and having pins for gripping an article, tension springs urging said arms toward each other to hold the pins in gripping relation with the article, and cooperating cam elements on said arms and on said frame for swinging said arms in the direction to release the article.

8. A transfer apparatus as recited in claim 7, and spring pressed pins projecting from said base member for resiliently engaging with the article and urging the same toward the article gripping pins on said arms.

References Cited in the file of this patent

UNITED STATES PATENTS

| | | |
|---|---|---|
| 1,775,918 | Smith | Sept. 16, 1930 |
| 2,611,493 | Nordquist | Sept. 23, 1952 |
| 2,643,778 | Socke | June 30, 1953 |